United States Patent [19] [11] Patent Number: 4,664,493
Takagi [45] Date of Patent: May 12, 1987

[54] PHOTOGRAPHIC SHUTTER
[75] Inventor: Masaaki Takagi, Tokyo, Japan
[73] Assignee: Copal Company Limited, Tokyo, Japan
[21] Appl. No.: 806,960
[22] Filed: Dec. 9, 1985
[30] Foreign Application Priority Data
Dec. 10, 1984 [JP] Japan .................................. 59-260344
Aug. 29, 1985 [JP] Japan .................................. 60-190299
[51] Int. Cl.⁴ ........................... G03B 9/60; G03B 9/36; G03B 9/06
[52] U.S. Cl. ..................................... 354/226; 354/249; 354/251
[58] Field of Search ........................ 354/226, 246–249, 354/251

[56] References Cited
U.S. PATENT DOCUMENTS 3,496,853  2/1970  Rittman ................. 354/251
3,810,222  5/1974  Nakagawa ............. 354/226
3,825,940  7/1974  Hayami ............... 354/251 X
4,104,665  8/1978  Tadashi et al. .......... 354/246 X
4,142,789  3/1979  Koyama et al. ......... 354/226 X
4,199,243  4/1980  Nakano ................ 354/173
4,220,409  9/1980  Inoue ............... 354/249 X Primary Examiner—Donald A. Griffin
Attorney, Agent, or Firm—Cushman, Darby & Cushman

[57] ABSTRACT

To eliminate manual cocking operation and to facilitate in making the size of a camera compact, a spring made of a shape memory alloy plastically deformable at normal temperature but restoring a powerful resiliency when heated is associated with the shutter driving mechanism in arranging the shutter driving mechanism so that the latter assumes its cocked state in its normal state and that, upon depression of the shutter button, an electric current is supplied to the above-mentioned spring to heat same and to cause an opening and closing movement of the shutter blades by virtue of the resulting resiliency gained by the spring, and that upon completion of the opening and closing movement of the shutter blades, the conduction of electric current to the spring is cut off to deprive this spring of its resiliency whereby automatically causing the shutter driving mechanism to resume its cocked state.

16 Claims, 10 Drawing Figures

PHOTOGRAPHIC SHUTTER

BACKGROUND OF THE INVENTION (a) Field of the Invention

The present invention relates to a photographic shutter, and more particularly it relates to an improvement of the so-called non-cocking type shutter.

(b) Description of the Prior Art

In recent compact cameras, film winding and shutter cocking are performed by a drive motor housed within the camera body. To comply with the increasing demand for the development of more compact and lightweight cameras, the size of the motor has become smaller and its torque has been reduced accordingly, and along therewith the amount of force for cocking the shutter and also the space for accomodating the cocking mechanism have come to be restricted, and thus there has been the desire for the development of the so-called non-cocking type photographic shutter which is compact in size and does not require cocking operations externally of the camera body.

As the non-cocking type shutter, there has been already placed in the market a shutter which uses an electromagnetically operated plunger. However, this prior art shutter has the drawback that it is difficult to make the mechanism in a compact size.

SUMMARY OF THE INVENTION

In view of the above, it is the primary object of the present invention to provide a photographic shutter which is free of the above-mentioned drawbacks of the prior art shutter and which, despite of its being of the non-cocking type, is easy to make in a compact size.

According to the present invention, the above-mentioned object is attained by arranging so that a spring made of a shape memory alloy which is plastically deformable at normal temperature but recovers a powerful resiliency when heated is provided in association with the shutter mechanism to render the latter to the cocked state normally and that when the shutter button is depressed, an electric current is supplied to said spring to heat same to thereby cause opening and closing movements of the shutter blades due to the resiliency of said spring, and that upon termination of said opening and closing movements of the shutter blades, the supply of the electric current to said spring is cut off to deprive the spring of its resiliency, whereby restoring the shutter mechanism to its cocked state again.

According to a preferred formation of the present invention, either a motor or a cocking mechanism for cocking the shutter becomes unnecessary, whereby the shutter mechanism as a whole can be relatively simplified, and thus it is possible to attain a substantial reduction of its size.

This and other objects of the present invention will become more apparent during the course of the following detailed description and appended claims.

DETAILED DESCRIPTION OF THE PREFERRED EMBODIMENTS

Figure 1:
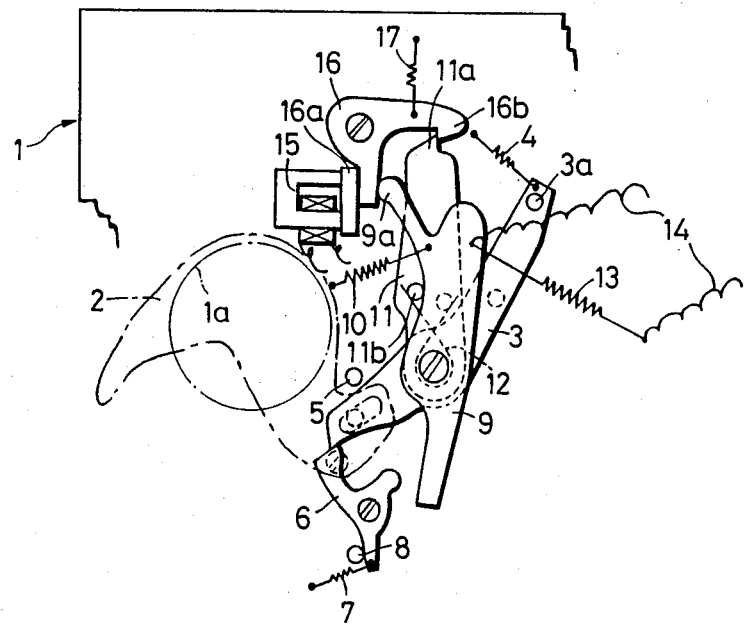
FIG. 1 is a plan view showing the structure of a first embodiment of the shutter according to the present invention.

To begin with, reference is given to FIG. 1 to describe the first embodiment of the present invention. This drawing shows the shutter in its cocked state. Numeral 1 represents a shutter base plate having an exposure aperture 1a; 2 a pair of shutter blades concurrently serving as aperture blades (only one of the paired blades is illustrated in the drawings for the sake of simplicity); 3 an opening and closing lever rotatably supported on the shutter base plate 1 and coupled to the shutter blade 2 by a pin-slot connection and having an engaging pin 3a extending outwardly from an end of an arm thereof; 4 an opening driving spring for urging the opening and closing lever 3 to rotate counter-clockwise (urged to open); 5 a blocking pin extending outwardly from the shutter base plate 1 for blocking an excessive clockwise rotation (closing movement) of the opening and closing lever 3; 6 an anchoring lever of the opening and closing lever and it is rotatably supported on the shutter base plate 1 for anchoring the opening and closing lever 3 in its closing position by the engagement of the end of one of the arms of the anchoring lever with the end of the other arm of the opening and closing lever 3; 7 a spring for urging the anchoring lever 6 to rotate clockwise; and 8 a blocking pin extending outwardly from the shutter base plate 1 for blocking an excessive clockwise rotation of the anchoring lever 6. Numeral 6 denotes an intermediate lever rotatably supported in coaxial relationship with the opening and closing lever 3 for causing, by one of its arms during a clockwise rotation (movement in the closing direction), a counter-clockwise rotation of the anchoring lever 6 and having a resilient projection 9a formed on the other of its arms; 10 a return spring urging the intermediate lever 9 to rotate counter-clockwise (movement in the opening direction); 11 a closure driving lever rotatably secured to the shutter base plate 1 coaxially with the opening and closing lever 3 and being urged to rotate clockwise (urged to close) by a closing spring 12 [which urges the intermediate lever 9 to rotate counter-clockwise (movement in the opening direction)] which is spanned between itself and the intermediate lever 9, and having an engaging portion 11a formed at its own foremost end portion and also having an engaging pin 11b extending outwardly from its intermediate site and engaging the left side edge of the intermediate lever 9, and being brought into abutment, by its right side edge 11c, with the engaging pin 3a during its own clockwise rotation (movement in the closing direction); 13 a spring made of a shape memory alloy of, for example, Ti—Ni or a copper-base metal which is spanned in the direction of clockwise rotation (in the closing direction) relative to the intermediate lever 9 and assumes martensite phase at normal temperature and apparently plastically deformable, whereas it is modified into austenite phase at a high temperature and restores its initial shape and recovers its resiliency which is more powerful than that of the return spring 10 and of a closing spring 12; 14 lead wires connecting between a shutter control circuit not shown and the opposite terminals of the spring 13; 15 an electromagnet fixed to the shutter base plate 1 and connected to an output end of the shutter control circuit not shown; 16 a closure anchoring lever rotatably supported on the shutter base plate 1 and having, secured to one of its arms, an iron piece 16a attractable to the electromagnet 15, and being urged at its right side by the projection 9a of the intermediate lever 9 for positive contact with the electromagnet 15, and anchoring the closure driving lever 11 in its opening position by the engagement, with the engaging portion 11a, of an anchoring claw 16b formed on its other arm; and 17 a spring urging the closure anchoring lever 16 to rotate counter-clockwise. And, it is assumed here that arrangement is provided so that, when the release switch is made by a releasing operation, an electric current is supplied to both the electromagnet 15 and the spring 13, and that, upon lapse of an appropriate exposure time by an exposure time control circuit provided in the shutter control circuit, the supply of the electric current to the electromagnet 15 is interrupted and, upon completion of an exposure, the supply of current to the spring 13 is also interrupted. It is assumed here also that the resiliency of the return spring 10 is set to be greater than that of the spring 17.

The shutter according to the present invention is constructed as stated above. Therefore, in the state of the shutter prior to a release, the spring 13 is being deformed (extended) by the spring force of the return spring 10 because of its being subjected to normal temperature, causing the intermediate lever 9 to urge the closure driving lever 11 to rotate counter-clockwise, with the result that the closing lever 11 is anchored of its movement by the closure anchoring lever 16 and along therewith the closing lever 11 urges the iron piece 16a against the electromagnet 15. At such a state of the mechanism, if the release switch is made by a releasing operation, the electromagnet 15 is supplied with an electric current and thus excited, causing the iron piece 16a to be attracted to the electromagnet 15. Along therewith, the spring 13 is also supplied with an electric current, and is heated thereby so that it restores its initial (constricted) shape and recovers its resiliency, causing a clockwise rotation of the intermediate lever 9 while tensioning both the return spring 10 and the closing spring 12. And, upon a further clockwise rotation of the intermediate lever 9, the opening anchoring lever 6 is caused to rotate counter-clockwise by one of its arms to thereby relieve the opening and closing lever 3 of its anchored state, so that the latter is rotated counter-clockwise by the action of the opening driving spring 4 to thereby open the shutter blade 2. And, upon arrival of an appropriate timing in term of second by the action of the exposure time control circuit, the supply of the electric current to the electromagnet ceases, with the result that the closure anchoring lever 16 is caused to rotate counter-clockwise by the action of the spring 17 to release the anchoring of the closure driving lever 11, whereby the latter lever 11 is caused to rotate clockwise by the action of the closing spring 12 which has been already tensioned, thereby closing the shutter blade 2. Upon termination of the exposure, the supply of the electric current to the spring 13 ceases also, so that this spring 13 is quickly cooled by the external air to be rendered to the apparently plastically deformable state. Whereupon, the intermediate lever 9 commences a counter-clockwise rotation by the action of both the return spring 10 and the closing spring 12. At such time of operation, the opening anchoring lever 6 makes a clockwise rotation by the action of the spring 7 to thereby anchor the opening and closing lever 3. In succession thereto, the left side edge of the intermediate lever 9 abuts the engaging pin 11b so that the resiliency of the closing spring 12 no longer acts as a rotation-urging force, allowing both the intermediate lever 9 and the closure driving lever 11 as an integral unit to make a further counter-clockwise rotation by the action of the return spring 10. And, finally, the projection 9a of the intermediate lever 9 causes the closure anchoring lever 16 to rotate counter-clockwise to thereby urge the iron piece 16a against the electromagnet 15 and also causes the engaging claw 16b to engage the engaging portion 11a, thus rendering the closure driving lever 11 to its anchored state (the state of FIG. 1). With this, a series of operations of the mechanism end. It should be noted here, however, that the shutter of the present invention requires, in order to cock the shutter, only the addition of a spring 13 made of a shape memory alloy of a size similar to that of an ordinary spring, and makes the provision of a motor or a clocking mechanism unnecessary, so that, in spite of the shutter being of the non-cocking type, it can have a very compact size.

Figure 2:
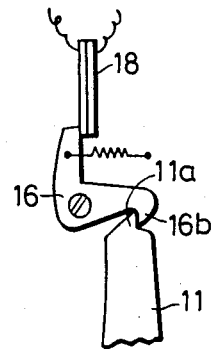
FIG. 2 is a plan view showing an example of structure of the closure anchoring lever portion of the mechanism different from that shown in FIG. 1.

It should be noted here also that the abovesaid electromagnet 15 may be replaced by such a type which is operative so that, prior to the termination of an exposure, it is in its non-conducting state and attracts the iron piece 16a of the closure anchoring lever 16, while at the completion of the exposure, it is supplied with an electric current and releases the attraction of this iron piece 16a. Also, as shown in FIG. 2, in place of the electromagnet 15, there may be employed a bimorph type cell 18 to provide a system which releases the anchoring of the closure anchoring lever 16. Furthermore, the spring 13 made of a shape memory alloy may be heated by any method other than by the supply of an electric current.

Figure 3:
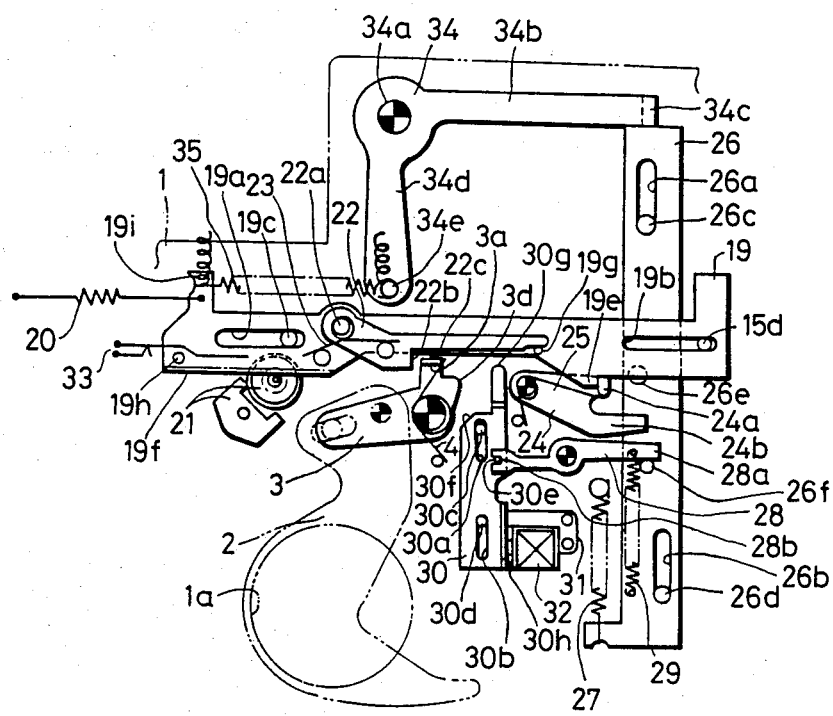
FIG. 3 is a plan view showing a second embodiment of the shutter according to the present invention.

FIG. 3 shows a second embodiment of the present invention. In this Figure, those parts and portions identical with or similar to those shown in FIG. 1 are assigned with same reference numerals. Numeral 19 represents a driving member having elongated slots 19a and 19b, and this member is guided by pins 19c and 19d, respectively, which extend outwardly from the shutter base plate 1, and this member is urged in the left direction by a return spring 20. Also, the driving member 19 has the formation of a hook portion 19e which, in turn, carries pins 19g and 19h extending outwardly therefrom. This driving member 19 further has the formation of a rack 19f which meshes with a governor 21. Numeral 22 denotes a driving lever which is rotatable about an axis 22a provided on the driving member 19 and which has the formation of cam faces 22b, 22c and an oblique face 22d. This lever 22 is urged by a spring 23 to rotate clockwise and is positioned by the pin 19g extending from the driving member 19. Numeral 24 represents an anchoring claw which is rotatably supported on the shutter base plate 1 and has a bent extension 24a which anchors the hook portion 19e of the driving member 19 and an arm 24b, and this anchoring claw is urged by a spring 25 to rotate counter-clockwise. Numeral 26 denotes a release member which has elongated slots 26a and 26b and is guided by pins 26c and 26d which extend outwardly from the shutter base plate 1 and is urged to ascend by a spring 27. The release member 26 also has pins 26e and 26f which extend outwardly therefrom. Numeral 28 represents an interlocking lever which is rotatably supported on the shutter base plate 1 and is coupled to the release member 26 by a spring 29 and has an arm 28a abutting a pin 26f of the release member 26 and a fork portion 28b. Numeral 30 denotes a movable iron piece of the electromagnetic device and has elongated slots 30a and 30b and is guided by pins 30c and 30d extending outwardly from the shutter base plate 1, and has, extending outwardly from this iron piece, a pin 30e which is snugly fit in the fork portion 28b of the interlocking lever 28. Also, said movable iron piece 30 has the formation of a cam face 30f for restricting the movement of the projection 3b of the opening and closing lever 3, a projection 30g facing the cam face 22c of the driving lever 22, and an attracting face 30h. Numeral 31 represents an iron core of the electromagnetic device and is fixed to the shutter base plate 1. Numeral 32 denotes a coil of this electromagnetic device. Numeral 33 indicates a trigger switch which is released by the pin 19h when the driving member 19 moves to the right side in the drawing. Numeral 34 represents a release lever which is rotatable about an axis 34a provided on the shutter base plate 1 and has, on one 34b of its arms, a bent portion 34c which is urged against the apex of the release member 26, and has a pin 34e formed on the other of the arms. Numeral 35 denotes a spring made of a shape memory alloy similar to the spring 13 shown in FIG. 1, and it is spanned between the arm 19i of the driving member 19 and a pin 34e of the release member 34.

Figure 4:
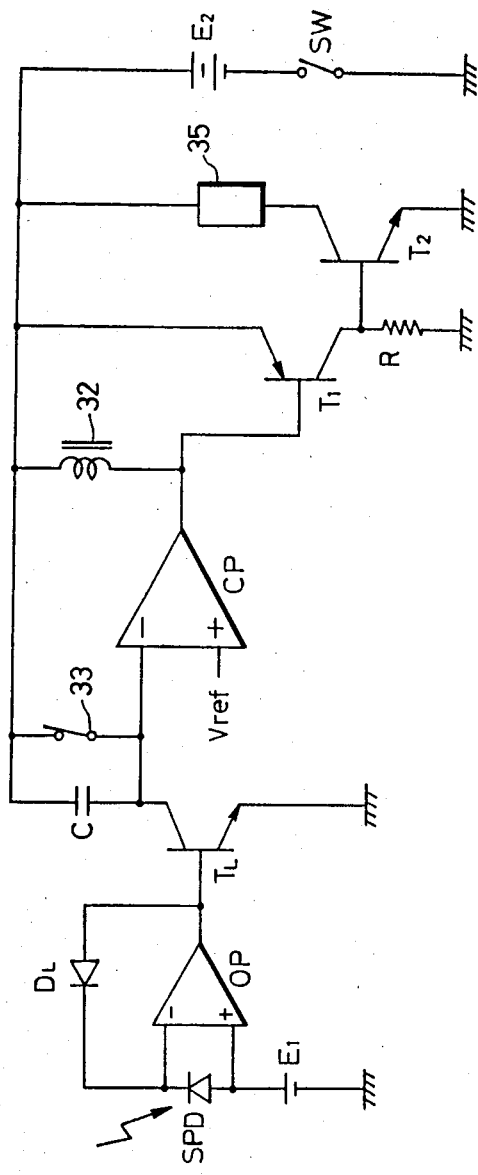
FIG. 4 is a wiring diagram showing an example of the exposure time control circuit for use in the second embodiment.

FIG. 4 shows an exposure time control circuit suitable for use in the abovesaid second embodiment. Symbols SPD represents a silicon diode serving as the light-receiving device; $E_1$ a biasing power supply; OP an operating amplifier; $D_L$ a diode for logarithmic constriction; $T_L$ a transistor for logarithmic extension; C denotes a capacitor for controlling exposure time; CP a comparator; $T_1$, $T_2$ transistors; R a resistor; $E_2$ a main power supply; and SW a main switch.

Description will next be made of the operation of the above-mentioned shutter apparatus.

When, to begin with, the power switch SW is made by a releasing operation, power is supplied to the respective portions of the circuit. Since the output of the comparator CP is at "L" level, an electric current flows through the coil 32 so that the iron core 31 attracts the movable iron piece 30. At the same time therewith, the transistor $T_1$ is rendered conductive, causing the transistor $T_2$ to become conductive, so that the spring 35 made of a shape memory alloy also becomes conducting and is heated. Whereupon, the spring 35 constricts to restore its initial shape. Owing to its first half of the constriction of this spring 35, the release lever 34 is caused to rotate clockwise, thereby pushing the release member 26 downwardly. Since, at such a time, the pin 26f of the release member 26 undergoes a descension, the interlocking lever 28 which is coupled to the release member 26 by the spring 29 is thereby caused to make a slight clockwise rotation for the amount of a play existing in the fork portion 28b and stops thereat. When the release member 26 is pushed downwardly to a further extend, the spring 29 is tensioned, causing the pin 26e of the release member 26 to push the arm 24b of the anchoring claw 24 to thereby rotate this anchoring claw 24 clockwise, so that the bent extension 24a of the anchoring claw 24 is disengaged from the projection 19e of the driving member 19. And, owing to the last half constriction of the spring 35, the driving member 19 commences a travel to the right side against the force of the spring 20. At this moment, the driving member 19 makes a gentle travel by means of the govenor device 21 to break the switch 33 by the pin 19h of the driving member 19, to thereby excite the abovesaid exposure time control circuit. In association with this operation, the cam face 22b of the driving lever 22 provided on the driving member 19 pushes the bent extension 3a of the sector opening and closing lever 3. As a result, the sector opening and closing lever 3 commences a clockwise rotation against the force of the spring 4 to thereby open the sector 2. Thereafter, when the output of the comparator CP becomes inverted to "H" level in association with an information of brightness of an object for photography, the supply of the electric current to the coil 32 is cut off, causing the iron piece 31 is demagnetized, so that the movable iron piece 30 undergoes a quick ascension via the interlocking lever 28 owing to the restoring force of the spring 27, so that the projection 30g is caused to abut the cam face 22c of the driving lever 22, causing the driving lever 22 to rotate counter-clockwise against the force of the spring 23. This movement of the driving lever 22 causes the cam face 22b to move to the outside of the loci of the bent extension 3a of the opening and closing lever 3, and accordingly the latter lever 3 is rotated counter-clockwise by the action of the spring 4 to thereby close the shutter blade 2. Also, owing to the inversion to "H" level of the output of comparator CP, the transistor $T_1$ is cut off, causing the transistor $T_2$ to be rendered off, so that the spring 35 becomes non-conductive and returns to its cooled state in which the spring 35 loses its resiliency and is rendered to the plastically deformable state. As a consequence, the urging onto the release member 26 by the release lever 34 is removed, so that the release member 26 makes an ascension by the force of the spring 27. During this part of operation, the interlocking lever 28 is rotated counter-clockwise by the pin 26f of the release member 26, and along therewith the movable iron piece 30 also returns to its initial position. At this moment, the driving member 19 also is restored to its initial position by virtue of the restoring force of the return spring 20. It should be noted here that the oblique face 22d of the driving lever 22 contributes for the driving lever 22 in its making an easy passing over the bent extension 3a of the opening and closing lever 3 when the driving member 19 returns to its initial position.

In such a way as described above, a series of operations come to an end. It should be noted here, however, that the shutter of the present invention employs a spring made of a shape memory alloy of a size which is about the same as that of an ordinary spring in order to drive the shutter and also uses an ordinary spring intended for the cocking of the shutter, so that a motor or a cocking mechanism is unnecessary, and as a result, in spite of this shutter being of the non-cocking type, it can be provided in a very compact size.

Figure 5:
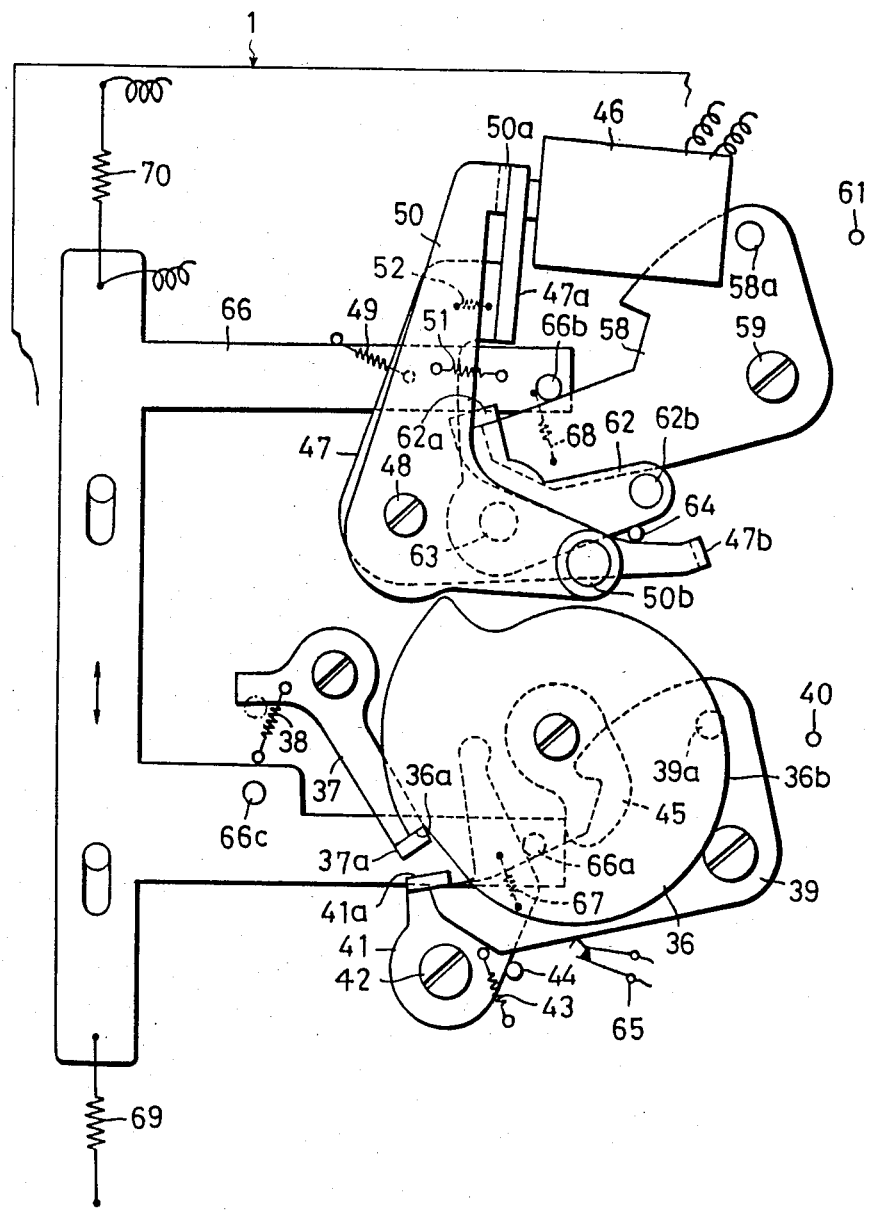
FIGS. 5 to 10 are plan views showing a third to an eighth embodiment of the shutter according to the present invention.

FIG. 5 is a plan view showing a third embodiment in its cocked state. Numeral 36 represents a control cam rotatably supported on a shutter base plate 1 and it has a hook 36a and a cam face 36b whose diameter progressively increases as its radius travels clockwise, and it is urged to rotate counter-clockwise; 37 a release lever rotatably attached to the shutter base plate 1 and having a bent portion 37a which is brought into engagement with a hook 36a in the cocked state of the shutter; 38 a spring for urging the release lever 37 to rotate counter-clockwise; 39 a shutter blade opening member rotatably supported on the shutter base plate 1 and having a pin 39a; 40 a stopper extending outwardly from the shutter base plate 1 for limiting the urged clockwise rotation of the shutter blade opening member 39; 41 an opening lock lever rotatably supported on the shutter base plate 1 by an axis 42 and having a bent portion 41a intended to anchor the shutter blade opening member 39 in its cocked position when the shutter is cocked; 43 a spring for urging the opening lock lever 41 to rotate clockwise; 44 a stopper extending outwardly from the shutter base plate 1 for restricting the clockwise rotation of the lock lever 41; 45 and operating piece attached integrally to the control cam 36 for urging the lock lever 41 to rotate counter-clockwise in the final period of the counter-clockwise movement of the control cam 36; 46 an electromagnet fixed to the shutter base plate 1 and whose electric conduction time is controlled by an exposure time control circuit not shown; 47 an armature lever rotatably supported on the shutter base plate 1 by an axis 48 and having, at the end of one of its arms, a pole contacting portion 47a which can contact a magnetic pole of the electromagnet 46, and having a bent portion 47b at the end of the other arm; 49 a spring for urging the armature lever 47 to rotate counter-clockwise; 50 a holding lever rotatably mounted on the axis 48 and having, at the end of one of its arms, a bent portion 50a which is brought onto contact with the pole contacting portion 47a of the armature lever 47 and having, at the end of the other arm, a roller 50b which rolls into contact with the cam face 36b of the control cam 36; 51 a spring for urging the holding lever 50 to rotate clockwise; 52 a spring spanned between the armature lever 47 and the holding lever 50; 58 a shutter blade closing member rotatably supported on the shutter base plate 1 by an axis 59 and having a pin 58a; 61 a stopper extending outwardly from the shutter base plate 1 for limiting the clockwise rotation of the shuttter blade closing member 58; 62 a closure lock lever rotatably supported on the shutter base plate 1 by an axis 63 and having, at the end of one of its arms, a bent portion 62a for anchoring the shutter closing member 58 in its cocked position during the cocked state of the shutter and having, at the end of the other arm, a pin 62b which intrudes into the loci of the armature lever 47, and being urged to rotate clockwise by a spring not shown; and 64 a stopper extending outwardly from the shutter base plate 1 for restricting the clockwise rotation of the lock lever 62. Numeral 65 represents a trigger switch which is released by the clockwise rotation of the shutter blade opening member 39; 66 a cocking plate vertically slidably supported on the shutter base plate 1 by pin-slot connections and having, on one of its arms, a pin 66a extending outwardly therefrom for engagement with the shutter blade opening member 39 and having, on the other arm, a pin 66b extending outwardly therefrom for being engageable with the shutter blade closing member 58, and having, at an intermediate site of said one of the arms, a pin 66c extending outwardly therefrom for being engageable with the release lever 37; 67 an opening spring spanned between one of the arms of the cocking plate 66 and the shutter blade opening member 39; 68 a closing spring spanned between the other arm of the cocking plate 66 and the shutter blade closing member 58; 69 a return spring urging the cocking plate 66 to move downwardly; and 70 a spring made of a same shape memory alloy as that of the spring 13 of the first embodiment and being plastically deformable at normal temperature but restoring its initial shape at a high temperature to thereby recover its resiliency thereby being able to move the cocking lever 66 upwardly against the force of the return spring 69. This spring 70 and also the trigger switch 65 are connected to an exposure time control circuit not shown.

The third embodiment is of the construction as described above. Therefore, upon making the power supply switch not shown by a release operation, the exposure time control circuit is plunged into its operating state, causing the electromagnet 46 to be energized so that the armature lever 47 is held in its attracted state as illustrated, and along therewith the spring 70 is also supplied with an electric current to thereby be heated and becomes constricted, thereby causing the cocking plate 66 to move upwardly. As both the opening spring 67 and the closing spring 68 are tensioned, the pin 66c is brought into engagement with the release lever 37 to rotate this lever 37 clockwise. As a result, the bent portion 37a of this release lever 37 becomes disengaged from the hook 36a, so that the control cam 36, together with the actuator piece 45, is caused to rotate counter-clockwise by a driving spring not shown. However, at such part of operation, the cam face 36b first causes the holding lever 50 to rotate counter-clockwise to thereby let its bent portion 50a to depart from the pole-contacting portion 47a of the armature lever 47, and in the final period of the counter-clockwise rotation of the control cam 36, the actuator piece 45 opens to rotate the opening lock lever 41 counter-clockwise to cause its bent portion 41a to depart from the shutter blade opening member 39. At the same time therewith, the trigger switch 65 is broken. Accordingly, the shutter blade opening member 39 makes a clockwise rotation by the action of the opening spring 67 to thereby open the shutter blade not shown, and along therewith said rotation of the member 39 causes commencement of the counting of the exposure time by virture of the exposure time control circuit. And, upon lapse of an appropriate exposure time in accordance with the brightness of the object for photography, the electromagnet 46 is de-energized. As a result, this electromagnet 46 loses its attracting force, so that the armature lever 47 undergoes a counter-clockwise rotation from its illustrated position, causing the closure lock lever 52 to rotate counter-clockwise to thereby let its bent portion 62a to depart from the shutter blade closing member 58. Accordingly, the shutter blade closing member 58 is rotated clockwise by the action of the closing spring 58 to thereby close the shutter blade not shown, thus completing one regular exposure operation.

Also, the spring 70 is rendered to the non-conducting state and returns to its cooled state, so that it loses resiliency and resumes its plastically deformable state, so that the cocking plate 66 returns to its illustrated position by virtue of the return spring 69. At such a moment, pins 66a and 66b bring the shutter blade opening member 39 and the shutter blade closing member 58 to their cocked positions. It should be noted here that, in this embodiment, arrangement is provided so that only the control cam 36 is brought into the cocked state at the same time with, for example, the widing of the film.

Figure 6:
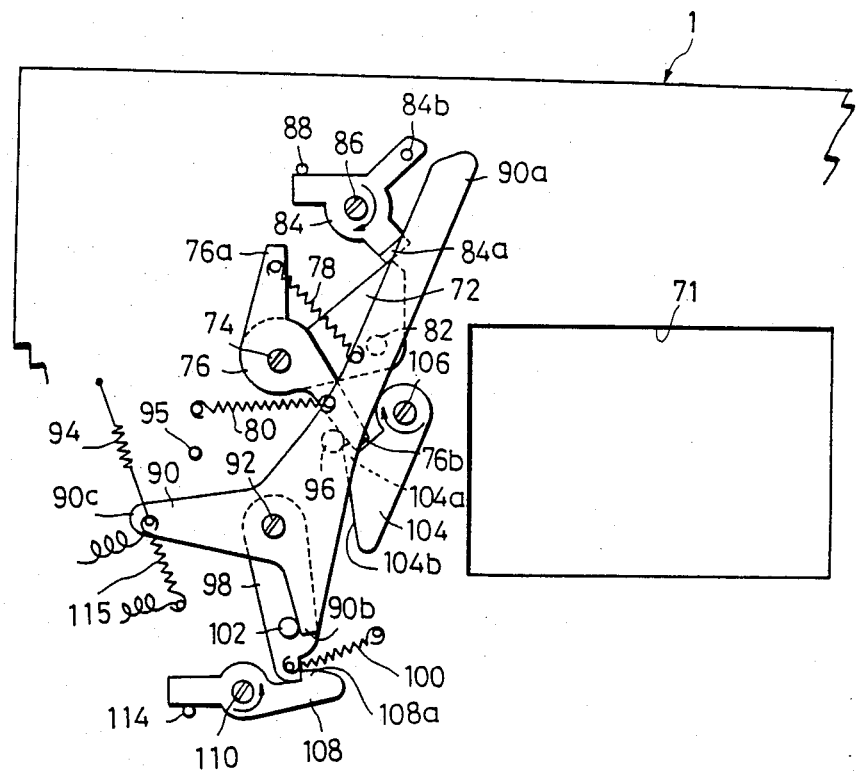

FIG. 6 is a plan view showing the cocked state of the embodiment of FIG. 4. Numeral 71 represents an exposure aperture formed in the shutter base plate 1; 72 a front blade driving lever rotatably supported by an axis 74 extending outwardly from the shutter base plate 1; 76 a front blade cocking lever rotatably supported by said axis 74. Between one 76a of the arms of the lever 76 and the front blade driving lever 72, there is provided a front blade driving spring 78 to span there between. Also, between the other arm 76b and the shutter base plate 1, there is spanned a spring 80 for imparting a clockwise deviating force to the front blade cocking lever 76; 82 a stopper pin extending outwardly from the front blade driving lever 72 so as to be able to abut said one 76a of the arms of the front blade cocking lever 76. A front shutter blade group not shown is caused to move between the position of closing the exposure aperture 71 and the position of opening this aperture by the reciprocating movements of the front blade driving lever 72 within a predetermined range of angle. Numeral 84 represents a front blade release lever which is rotatably supported by an axis 86 extending outwardly from the shutter base plate 1, and at one end of this lever is formed an extension piece 84a which is brought into engagement with the forward end portion of the front blade driving lever 72 to be able to block the counter-clockwise rotation of this lever 72, and at the other end of the lever 84 extends a pin 84b outwardly therefrom. Furthermore, the front blade release lever 84 is imparted a clockwise deviating force by a spring not shown, and is held in the illustrated position by a stopper pin 88. Numeral 90 represents a cocking lever of a substantially Y shape having arms 90a, 90b and 90c and it is rotatably supported by an axis 92 extending outwardly from the shutter base plate 1, and is urged to rotate clockwise by a return spring 94 spanning between the arm 90c and the shutter base plate 1. Also, arrangement is provided so that the forward end portion of the arm 90a is brought into pressure contact with the pin 84b of the front blade release lever 84 during the counter-clockwise rotation of said arm 90a to thereby rotate the release lever 84 counter-clockwise. Numeral 95 denotes a stopper pin for the cocking lever extending outwardly from the shutter base plate 1. Numeral 96 represents a pin extending outwardly from the bottom face of the arm 90a of the cocking lever 90 so as to be engageable with the arm 76b of the front blade cocking lever 76. Numeral 98 represents a rear blade driving lever rotatably supported by an axis 92, between whose end portion and the shutter base plate 1 is spanned a rear blade driving spring 100. Numeral 102 denotes a pin extending outwardly from the rear blade driving lever 98 so as to be engageable with the arm 90b of the cocking lever 90. Numeral 104 represents an anchoring lever rotatably supported by an axis 106 extending outwardly from the shutter base plate 1, and it has a hook 104a which is able to anchor the forward end portion of the arm 76b of the front blade cocking lever 76, and an oblique face 104b which can be engaged by the pin 102 extending outwardly from the rear blade driving lever 98, and it is urged to rotate clockwise by a spring not shown. Numeral 108 represents a rear blade release lever rotatably supported by an axis 110 extending outwardly from the shutter base plate 1, and has a hook portion 108a which is able to anchor the forward end portion of the rear blade driving lever 98. This rear blade release lever 108 is urged to rotate counter-clockwise by a spring not shown, and it is held in the illustrated position by a stopper pin 114 even in the stage before the shutter is cocked. Numeral 115 denotes a spring made of a shape memory alloy same as that of the spring 13 in the above-described first embodiment (FIG. 1) and which is able to undergo plastic deformation at normal temperature and recovers its resiliency by restoring its initial shape at a high temperature to thereby cause the cocking lever 90 to make a counter-clockwise rotation against the force of the spring 94. This spring 115 is connected to an exposure time control circuit not shown.

The fourth embodiment is constructed as described above. Therefore, upon the power supply switch not shown being made by a release operation, the exposure time control circuit is actuated to thereby cause an electric current to be supplied to the spring 115 to heat same so that this spring constricts to thereby rotate the cocking lever 90 counter-clockwise. Whereupon, the arm 90a of this cocking lever is urged against the pin 84b, so that the front blade release lever 84 is rotated counter-clockwise. Owing to this counter-clockwise rotation of the front blade release lever 84, the engagement between the extension piece 84a of said release lever 84 and the front blade driving lever 72 is removed, causing the front blade driving lever 72 is quickly rotated up to a position at which the pin 82 abuts the arm 76a of the front blade cocking lever 76 by the front blade driving spring 78. As a result, the front shutter blade group moves from the position of closing the exposure aperture 71 to the position of opening it, thus commencing an exposure. In succession thereto, as a result of a clockwise rotation of the rear blade release lever 108 via an appropriate associating mechanism, by a signal supplied from the exposure time control circuit not shown, it should be noted that, since the arm 90b has already retreated from the loci of movement of the pin 102, the blade driving lever 98 and the rear blade release lever 108 are disengaged from each other, with result that there blade driving lever 98 is quickly rotated counter-clockwise by the rear blade driving spring 100. Owing to this rotation of the rear blade driving lever 98, the rear shutter blade group moves from its position in which it opened the exposure aperture 71 over to the position of closing this aperture, and thus an exposure terminates. However, due to the counter-clockwise rotation of the rear blade driving lever 98 which takes place in succession to the termination of exposure, the pin 102 extending outwardly from this driving lever 98 abuts the oblique face 104b of the anchoring lever 104 to rotate same counter-clockwise, thus releasing the engagement between the arm 76b of the front blade cocking lever 76 and the anchoring lever 104. Accordingly, because the pin 96 has already retreated from the loci of movement of the front blade cocking lever 76, the front blade cocking lever 76, together with the front blade driving lever 72, is rotated clockwise by the action of the spring 80, and also owing to this rotation of the front blade cocking lever 76, the front shutter blade group which has till then been held in its open position is rendered to the closing position.

Also, after the completion of the exposure, the spring 115 returns to its non-conducting state, losing its resiliency and becomes to be plastically deformable, so that the cocking lever 90 is rotated clockwise by the return spring 94. Whereupon, the front blade cocking lever 76 is rotated counter-clockwise against the spring 80 and also against the front blade driving spring 78 by the action of the pin 96, so that the forward end portion of the arm 76b of said cocking lever 76 is anchored by the hook portion 104a of the anchoring lever 104, and along therewith the rear blade driving lever 98 is rotated clockwise against the force of the rear blade driving spring 110 by the arm 90b which engages the pin 102, so that the forward end portion of said lever 98 is anchored by the hook portion 108a of the rear blade release lever 108, so that the shutter is rendered to the cocked state.

Figure 7:
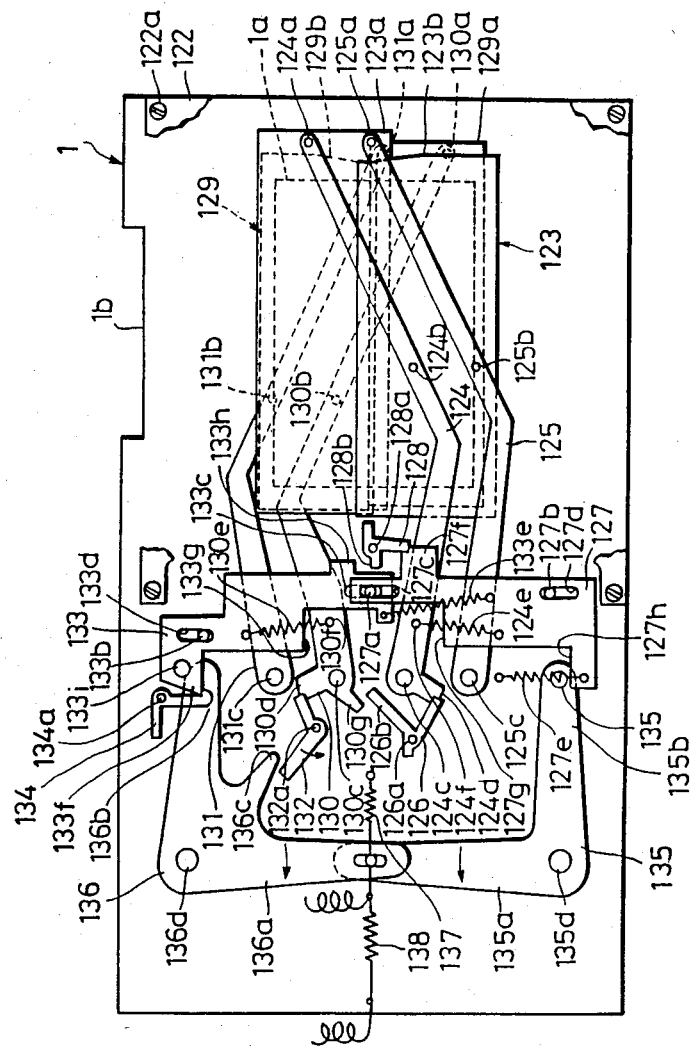

FIG. 7 is a plan view showing the cocked state of the fifth embodiment. A cover plate 122 is supported above the base plate 1 in a known manner by a pin 122a with a predetermined interval relative to the base plate 1. An opening blade group 123 for commencing an exposure is comprised of a slit-forming blade 123a provided with a slit-forming ridge and a covering blade 123b, and it is rotatably supported by pins 124a, 125a, 124b and 125b on an opening member 124 and an opening auxiliary member 125 which are supported on the shutter base plate 1. These opening member 124 and opening auxiliary member 125, in turn, are rotatably secured to the shutter base plate 1 by axes 124c and 125c. Also, the opening member 124 has its arm 124d anchored by an opening claw 126 and is urged to be clockwisely rotatable by an opening spring 124e. The opening claw 126 is rotatably mounted on the shutter base plate 1 by an axis 126a, and it is urged to rotate counter-clockwise by a spring not shown, and it has a bent arm 126b. An opening driving plate 127 is slidably supported on the shutter base plate 1 by axes 127a and 127b and has the formation of slide slots 127c and 127d. Also, between the shutter base plate 1 and the opening driving plate 127 is coupled a spring 127e for pulling the opening driving plate 127 upwardly, and also between the opening member 124 and the opening driving plate 127 is spanned a spring 124e, and a projection 127f is anchored by an anchoring claw 128 against the forces of the two springs 124e and 127e. Said anchoring claw 128 is rotatably mounted on the shutter base plate 1 by an axis 128a and it has an arm 128b and it is urged to rotate clockwise by a spring not shown. Furthermore, the opening driving plate 127 has the formation of a stepped portion 127g which engages a pin 124f provided on the opening member 124 to be acted upon by the spring 124e, and the formation of a stepped portion 127h which is brought into engagement with a pin of a cocking lever which will be described later. A closing blade group 129 for completing an exposure is constituted by a slit-forming blade 129a provided with a ridge intended to form a slit and a covering blade 129b, and it is rotatably supported by pins 130a, 131a; 130b, 131b on a closing member 130 and a closing auxiliary member 131 which, in turn, are supported on the shutter base plate 1. These closing member 130 and closing auxiliary member 131 are rotatably supported on the shutter base plate 1 by axes 130c and 131c, respectively. Also, the closing member 130 is anchored of its arm 130d by a closing claw 132, and it is urged to rotate counter-clockwise by a first spring 130e, and it has an arm 130g. The closing claw 132 is rotatably mounted on the shutter base plate 1 by an axis 132a, and is urged to rotate clockwise by a spring not shown. A closure driving plate 133 is slidably supported on the shutter base plate 1 by a combination of an axis 127a and a slide slot 133c and by a combination of an axis 133b and a slide slot 133d. Also, to the closure driving plate 133 is coupled a second spring 133e intended to pull this plate 133 downwardly, and an end of the first spring 130e is secured to said plate 133. And, a projection 133f is anchored by an anchoring claw 134 against the forces of said two springs 130e and 133e. It should be noted here that the anchoring claw 134 is rotatably mounted on the shutter base plate 1 by an axis 134a, and is urged to rotate counter-clockwise by a spring not shown. Also, the closure driving plate 133 has the formation of a stepped portion 133g which engages a pin 130f upon which the first spring 130e of the closing member 130 acts and also the formation of a projection 133h which engages the arm 128b of the anchoring claw 128, and furthermore it has, extending outwardly therefrom, a pin 133i which engages the arm of a cocking lever which will be described later. Numerals 135 and 136 denote a pair of cocking levers which are rotatably secured to the shutter base plate 1 by axes 135d and 136d, respectively, and whose respective ones 135a and 136a of the arms are coupled to each other by pin-slot connection. The other arm 135b of said cocking lever 135 has, extending outwardly therefrom, a pin 135c which engages the stepped portion 127h of the opening driving plate 127 from thereabove, whereas the other arm 136b of the cocking lever 136 engages the pin 133i of the closure driving plate 133 from therebelow, and still another arm 136c of said cocking lever 136 can be brought into engagement with the arm of the closing claw 132 from thereabove. Numeral 137 represents a return spring spanning between respective ones 135a and 136a of the cocking levers 135 and 136 and the shutter base plate 1 to urge these cocking levers 135 and 136 to rotate clockwise and counter-clockwise, respectively. Numeral 138 represents a spring spanning, on the opposite side of said return spring 137 and between the respective ones 135a and 136a of the arms of the cocking levers 135 and 136 and the shutter base plate 1 and it is made of the same shape memory alloy as that of the spring 13 of the first embodiment and is plastically deformable at normal temperature but restores its initial shape at a high temperature to thereby recovers its resiliency, causing the cocking levers 135 and 136 to rotate counter-clockwise and clockwise, respectively, against the force of the return spring 137. This spring 138 is connected to an exposure time control circuit not shown.

The fifth embodiment is constructed as described above. Therefore, upon making a power supply switch not shown by a release operation, the exposure time control circuit is rendered to its operating state, causing the spring 138 to be heated and become constricted, whereby rotating the cocking levers 135 and 136 counter-clockwise and clockwise, respectively, thereby removing the anchoring applied to the opening driving plate 127 and to the closure driving plate 133, and along therewith causing the closing claw 132 to rotate counter-clockwise about the axis 132a against the force of a spring not shown. Whereupon, the arm 130d of the closing member 130 is released of its anchoring and makes a counter-clockwise rotation about the axis 130c by the action of the first spring 130e. Owing to this counter-clockwise rotation of the closing member 130, the closing blade group 129 retreats, by its cooperation with the closing auxiliary member 131, from the illustrated first position to a second position at which it does not cover the exposure aperture 1a. In the finishing period of operation of the closing member 130, its arm 130g engages the arm 126b of the opening claw 126 to cause this opening claw 126 to rotate clockwise about the axis 126a against the force of a spring not shown to thereby remove the anchoring applied to the arm 124d of the opening member 124. Upon removal of anchoring applied to the arm 124d, the opening member 124 is rotated clockwise about the axis 124c by the action of the opening spring 124e, causing the opening blade group 123, in cooperation with the opening auxiliary member 125, to open the exposure aperture 1a, to thereby commence an exposure. At the time of operation of the opening member 124, the slit-forming blade 123a and the covering blade 123b are moved downwardly for different amounts of strokes, respectively, as well known, and they are folded one upon another. When, thus, an appropriate exposure time which is determined by the exposure time control circuit lapses, the anchoring claw 134 is caused by a known device not shown to rotate clockwise about the axis 134a against the force of a spring not shown to thereby release the projection 133f of the closure driving plate 133. The closure driving plate 133 is pulled by the second spring 133e and moves downwardly along the slide slots 133d and 133c. During this part of operation, the stepped portion 133g, carrying the pin 130f therewith, rotates the closing member 130 clockwise about the axis 130c. Owing to this clockwise rotation of the closing member 130, the closing blade group 129, in its cooperation with the closing auxiliary member 131, is operated from its upwardly folded second position to the downwardly unfolded first position in which it covers the exposure aperture 1a. In the finishing period of operation of the closure driving plate 133, the projection 133h engages the arm 128b of the anchoring claw 128 and rotates this anchoring claw 128 counter-clockwise about the axis 128a against the force of a spring not shown, relieving its engagement with the projection 127f of the opening driving plate 127 and causes the opening driving plate 127 to make an upward movement along the slide slots 127c and 127d under the action of the spring 127e. At the time of this movement of the opening driving plate 127, its stepped portion 127g pushes the pin 124f to thereby cause a counter-clockwise rotation of the opening member 124 about the axis 124c, and causes, in its cooperation with the opening auxiliary member 125, the opening blade group 123 to travel to the illustrated position in which the blade group 123 covers the exposure aperture 1a.

With the above-described series of operations, one shutter operation terminates. It should be noted here, however, that the spring 127e is not always necessary, and it is possible to commonly use the second spring 133e. Also, the opening driving plate 127 is not essential either, and arrangement may be provided so that its operation terminates in the state of being folded below the opening blade group 123 continuously after the completion of its exposing operation. Also, after the termination of an exposure, the spring 138 returns to its non-conducting state, in which it loses resiliency and becomes plastically deformable, so that the cocking levers 135 and 136 are rotated clockwise and counter-clockwise, respectively, by the return spring 137. As a result, in the state in which the opening member 124 and the closing member 130 are anchored by the opening claw 126 and the closing claw 132, respectively, the opening driving plate 127 and the closure driving plate 133 are moved downwardly and upwardly by the cocking levers 135 and 136, respectively, against the forces of the springs 124e, 127e and 130e, 133e, respectively, to be anchored by the anchoring claws 128 and 134, respectively, to thereby be rendered to the cocked state as shown.

Figure 8:
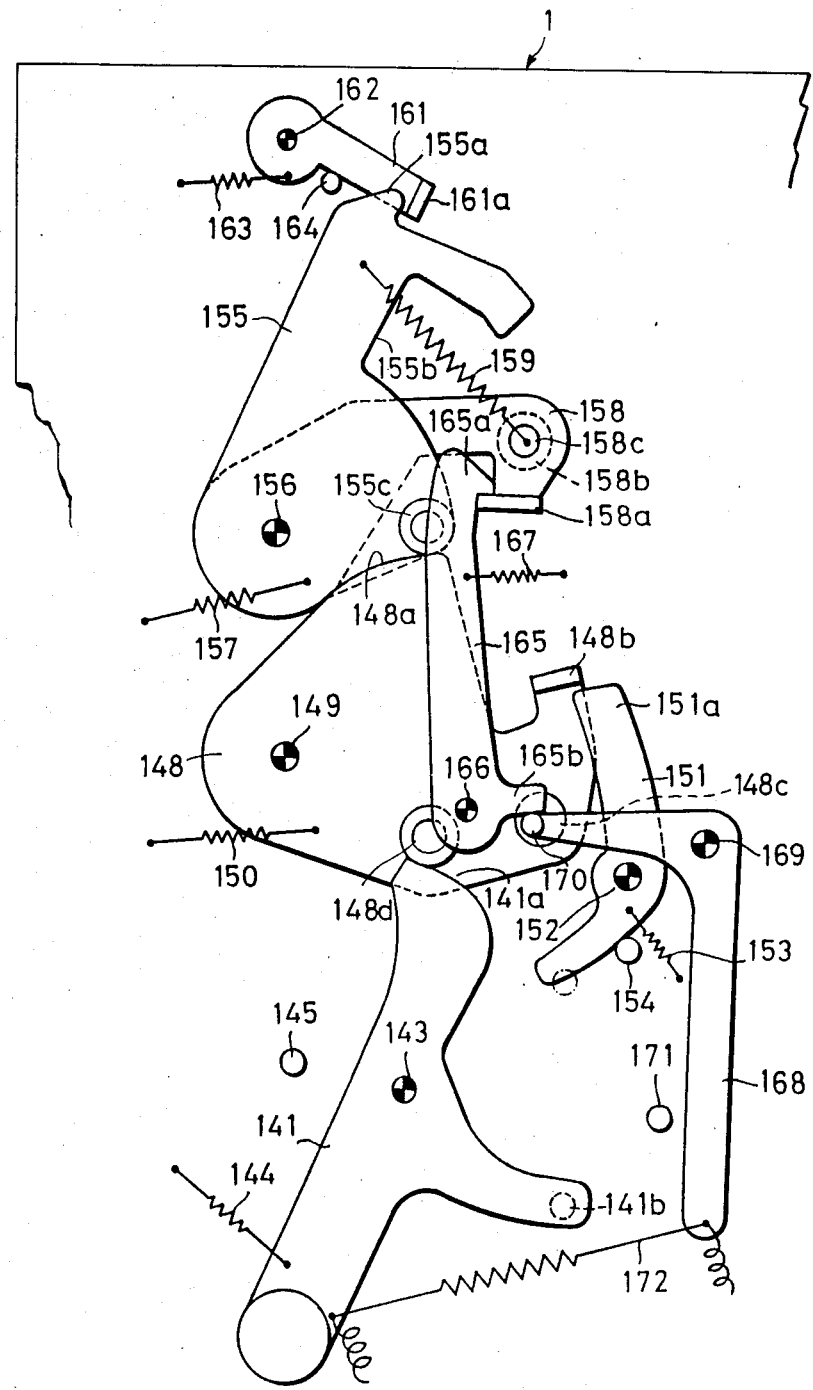

FIG. 8 is a plan view showing the cocked state of the sixth embodiment. Numeral 141 represents a cocking lever having the formation of a cam face 141a, and it has a release pin 141b extending outwardly therefrom, and it is rotatably supported by an axis 143 extending outwardly from a shutter base plate 1, and it is imparted a driving force as it is urged to rotate clockwise by a return spring 144. However, arrangement is provided so that this cocking lever 141 is limited of its further movement as it abuts a stopper 145 which extends outwardly from the shutter base plate 1. Numeral 148 denotes a front blade driving arm having the formation of a cam face 148a and a bent extension 148b, and having a blade supporting pin 148c extending in the direction of vertically passing through the sheet of drawing, and a roller 148d is disposed on the surface of this arm, and said arm is rotatably supported by an axis 149 extending outwardly from the shutter base plate 1, and it is imparted a driving force as it is urged to rotate clockwise by a spring 150. Numeral 151 represents a front blade anchoring lever and it has the formation of an engaging portion 151a, and it is rotatably supported by an axis 152 extending outwardly from the shutter base plate 1, and is urged to rotate counter-clockwise by a spring 153. This lever 151, however, is limited of its further movement by a pin 154 extending outwardly from the shutter base plate 1. Numeral 155 represents a rear blade driving arm (first lever), and it has the formation of a hook 155a and an abutting face 155b, and also has a roller 155c extending outwardly therefrom, and the arm 155 is rotatably supported by an axis 156 extending outwardly from the shutter base plate 1 and is imparted a driving force as it is urged to rotate clockwise by a spring 157. Numeral 158 represents a rear blade operating lever (second lever) having the formation of a bent extension 158a, and having a blade supporting pin 158b which extends in the direction of vertically passing through the sheet of drawing, and is imparted a driving force as it is urged to rotate counter-clockwise by a relatively weak spring 159 having one end secured to the rear blade driving arm 155. However, this lever 158 can be limited of its further movement as its pin 158c is brought into abutment with a face 155b of the rear blade driving arm 155. Numeral 161 denotes a rear blade anchoring lever having the formation of a bent extension 161a, and it is rotatably supported on an axis 162 extending outwardly from the shutter base plate 1, and is imparted a driving force as it is urged to rotate clockwise by a spring 163, but its further movement is limited by a pin 164 extending outwardly from the shutter base plate 1. Numeral 165 represents a lock lever having the formation of a hook portion 165a and a projection 165b, and it is rotatably supported on an axis 166 extending outwardly from a member which is integral with the shutter base plate 1, and is urged to rotate clockwise by a spring 167. This lever 165, however, is limited of its further movement as its projection 165b abuts a lock release lever which will be described later. Numeral 168 denotes those above-referred-to lock release lever which is rotatably supported on an axis 169 extending outwardly from the shutter base plate 1, and it has a pin 170 provided on one of its arms abuts said projection 165b of the lock lever 165 from therebelow. Numeral 171 denotes a stopper extending outwardly from the shutter base plate 1 to limit the clockwise rotation of the lock release lever 168. Numeral 172 represents a spring spanned between the cocking lever 141 and the lock release lever 168 and it is made of the same shape memory alloy as that of the spring 13 of the first embodiment, and is plastically deformable at normal temperature but restores its resiliency as it recovers its initial shape when subjected to a high temperature to thereby cause a counter-clockwise rotation of the cocking lever 141 against the force of the return spring 144 and also to cause a clockwise rotation of the lock release lever 168. This spring 172 is connected to an exposure time control circuit not shown.

The sixth embodiment is constructed as described above. Therefore, when a power supply switch not shown is made by a release operation, the exposure time control circuit is rendered to its operative state, and as the spring 172 constricts owing to its being heated by the electric current supplied thereto, the lock release lever 168 is caused to make a clockwise rotation, so that interlockingly therewith the lock lever 165 is caused to rotate counter-clockwise, thus releasing the restriction applied till then by the hook 165a to the bent extension 158 of the rear blade operating lever 158. By virtue of the restoring force of the spring 159, the rear blade operating lever 158 which has thus been removed of its restriction makes a counter-clockwise rotation, thereby the pin 158c of said lever 158 abuts the face 155b of the rear blade driving arm 155 and stops thereat. Due to this counter-clockwise rotation of the rear blade operation lever 158, the rear blade is moved, via the blade supporting pin 158b, to the starting position of opening the exposure aperture. On the other hand, the constriction of the spring 172 causes the cocking lever to rotate counter-clockwise to firstly remove the push-up, by the cam face 141a, of the cocking roller 148d. As a result, the front blade driving arm 148 makes some clockwise rotation by the action of the spring 150 to be anchored by the front blade anchoring lever 151. And, the rear blade driving arm 155 which has been removed of the push-up applied thereto till then by the cam face 148a also makes some clockwise rotation by the action of the spring 157 as a result of the abovesaid clockwise rotation of the front blade driving arm 148, and it is anchored by the rear blade anchoring lever 161. And, in the last stage of the clockwise rotation of the cocking lever 141, the front blade anchoring lever 151 is pushed by the pin 141b to rotate clockwise, while the front blade driving arm 148 which has been removed of its restriction makes a clockwise rotation due to the restoring force of the spring 150, whereby operating the front blade to open the exposure aperture. When, thereafter, an appropriate time in term of second lapses, the rear blade anchoring lever 161 is rotated counter-clockwise, and the resulting freed rear blade driving arm 155 makes a clockwise rotation integrally with the rear blade operating lever 158 by the restoring force of the spring 157 to thereby operate the rear blade to cover the exposure aperture, and thus one photographing operation completes.

Then, after the exposure, the spring 172 returns to its non-conducting state, loses its resiliency and becomes plastically deformable, so that the cocking lever 141 is rotated clockwise by the action of the return spring 144, whereas the lock lever 165 makes a clockwise rotation by the action of the spring 167 while causing a counter-clockwise rotation of the lock release lever 168, whereby the hook 165a is brought into engagement with the bent extension 158a of the rear blade operating lever 158. Owing to the subsequent clockwise rotation of the cocking lever 141, its cam face 141a pushes the roller 148d to cause the front blade driving arm 148 to rotate counter-clockwise to thereby cause the front blade to move to the staring position of covering the exposure aperture by the action of the blade supporting pin 148c. And, while the front blade driving arm 148 pushed the front blade anchoring lever 151 by its bent extension 148b, thus causing a clockwise rotation, said arm 148 arrives at its extreme counter-clockwise position. With this, the covering operation by the front blade comes to an end, and the exposure aperture is completely covered by the front blade, and the spring 150 is tensioned. It should be noted here that the front blade anchoring lever 151 is immediately removed of its restriction interlockingly with the shutter cocking operation, and it is returned to its illustrated state.

On the other hand, at the same time with the push-up of the roller 148d by the cam face 141a, the cam face 148a of the front blade driving arm 148 pushes the roller 155c to thereby cause the rear blade driving arm 155 to rotate counter-clockwise. At this instance also, it should be noted that, the rear blade driving arm 155 acts so that, while causing, by pushing, a counter-clockwise rotation of the rear blade anchoring lever 161 which has already been removed of its restriction and is now in its state of having rotated clockwise, the arm 155 arrives at its illustrated extreme counter-clockwisely rotated position. Accordingly, both the spring 157 and the spring 159 are tensioned.

Figure 9:
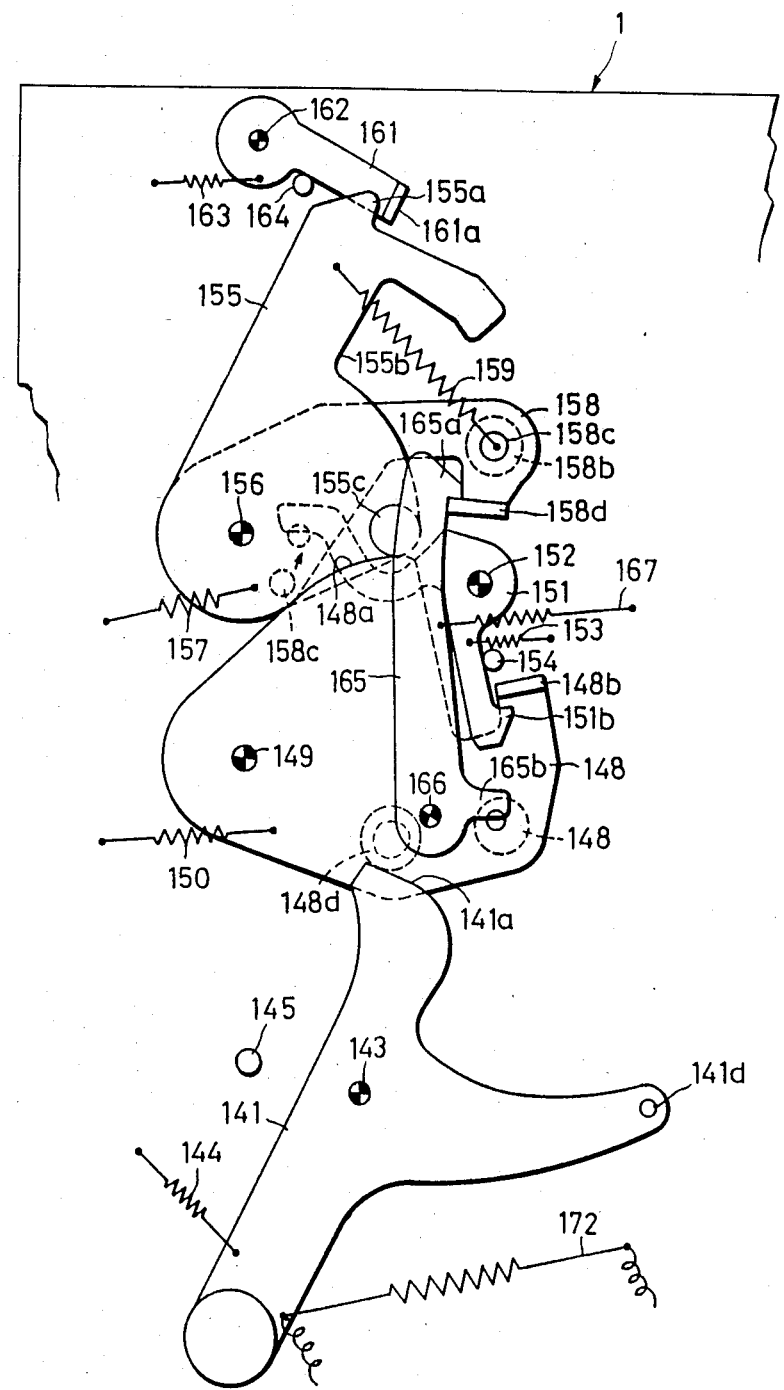

FIG. 9 is a plan view showing the cocked state of the seventh embodiment. The difference of this embodiment from the above-described sixth embodiment lies in the arrangement described below. That is, this arrangement has no provision of the lock release lever 168, so that at the time of a counter-clockwise rotation of the cocking lever 141, the lock lever 165 is directly rotated counter-clockwise by the pin 141d of this lever 141, and the front blade anchoring lever 151 has a hook 151b in place of an engaging portion 151a, and furtheremore, during the counter-clockwise rotation of the rear blade operating lever 155, its pin 155c rotates the front blade anchoring lever 151 clockwise. And, the principle of operation of this embodiment is basically the same as that of the above-described sixth embodiment, and therefore its details are omitted here.

Figure 10:
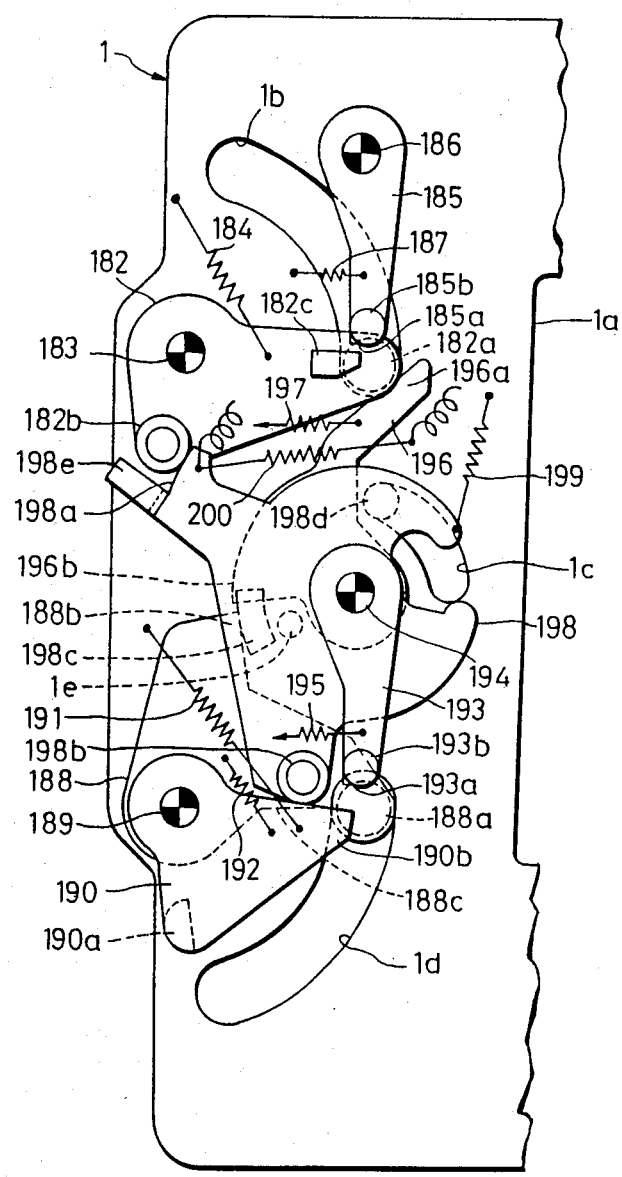

FIG. 10 is a plan view showing the cocked state of the eighth embodiment. Numeral 182 represents a front blade driving lever rotatably supported by an axis 183 on a shutter base plate 1 and urged to rotate counter-clockwise by a spring 184. This front blade driving lever 182, in its illustrated state, is such that its driving pin 182a abuts the end portion of the arcuate slot 1b formed in the shutter base plate 1 to block a further clockwise rotation of this lever 182. Also, a front blade not shown which is driven by the driving pin 182a, via an operating lever not shown in a known manner, is placed, at this stage, in a closing position of covering an exposure aperture 1a. Numeral 185 represents an anchoring lever rotatably supported by an axis 186 on the shutter base plate 1 and urged by a spring 187 to rotate clockwise, and this lever has an anchoring portion 185a for anchoring an engaging portion 182c of the front blade driving lever 182, and has a boss 185b. This anchoring lever 185 is restricted of its rotation range by a stopper not shown so as to be allowed to rotate within a predetermined range. Numeral 188 represents a first rear blade driving lever rotatably supported on the shutter base plate 1 by an axis 189, and it has a driving pin 188a, an engaging portion 188b and an engaging portion 188c. Numeral 190 represents a second rear blade driving lever supported on an axis 189 for free rotation, and it is urged to rotate counter-clockwise by a spring 191, and has engaging portions 190a and 190b. Numeral 192 denotes a spring coupled between the first rear blade driving lever 188 and the second rear blade driving lever 190, and it imparts to each of these two members 188 and 190 a pulling force in a direction that the engaging portion 190a of said second rear blade driving lever 190 is brought into abutment with the engaging portion 188c of the first rear blade driving lever 188. And, arrangement is provided so that said second rear blade driving lever 190 which is capable of bringing its engaging portion 190a into abutment with said engaging portion 188c is caused to rotate counter-clockwise jointly with said first rear blade driving lever 188 by a spring 191, and that, by virtue of the fact that the driving pin 188a of the first rear blade driving lever 188 is accordingly brought into abutment with an end portion of the arcuate slot 1d formed in the shutter base plate 1, the two levers 188 and 190 are blocked of their further counter-clockwise rotation. Also, the driving pin 188a is arranged so as to drive, in a known manner, a rear blade not shown via an operating lever not shown. In the illustrated state, the rear blade not shown is in the closing position of covering the exposure aperture 1a. Numeral 193 represents a rear blade anchoring lever rotatably supported on an axis 194 and it is urged to rotate clockwise by a spring 195, and it has an anchoring portion 193a for anchoring the engaging portion 190b of the second rear blade driving lever 190, and has a boss 193b. This anchoring lever 193, alike said front blade anchoring lever 185, is restricted of its rotational range by a stopper not shown, and is allowed to rotate within a predetermined range. Numeral 196 represents a rear blade driving holding lever which is rotatably supported on said axis 194, and it is urged to rotate counter-clockwise by a spring 197, and it has a cam portion 196a engageable with the driving pin 182a of the front blade driving lever 182 and an anchoring portion 196b engageable with the engaging portion 188b of the first rear blade driving lever 188. This rear blade drive holding lever 196 is arranged so that it is brought into abutment with a stopper pin 1e extending outwardly from the shutter base plate 1 so that its further counter-clockwise rotation is blocked, and that said engaging portion 188b is able to be brought into abutment with said anchoring portion 196b of the holding lever 196. Numeral 198 represents a cocking member rotatably supported on said axis 194, and it is urged to rotate counter-clockwise by a return spring 199, and it has a cam portion 198a engageable with the roller 182b provided on said front blade driving lever 182, a roller 198b engageable with the second rear blade driving lever 190, an anchoring portion 198c which is abuttable with the engaging portion 188b of the first rear blade driving lever 188, a boss 198d, and a projection 198e engageable with the boss 185b of the front blade anchoring lever 185. This cocking member 198, in its illustrated state, is such that its boss 198d abuts the end portion of the arcuate slot 1c which is formed in the shutter base plate 1 so that the boss is rendered to the state of being blocked of its further counter-clockwise rotation. Numeral 200 represents a spring spanned between the cocking member 198 and the shutter base plate 1 and being made of the same shape memory alloy as that of the spring 13 of the first embodiment, and being plastically deformable at normal temperature and being able to return to its initial shape when heated, thereby recovering its resiliency to cause the cocking member 198 to rotate clockwise against the force of the return spring 199. This spring 200 is connected to an exposure time control circuit not shown.

The eighth embodiment is constructed as described above. Therefore, when a power supply switch not shown is made by a releasing operation, the exposure time control circuit is rendered to its operating state, so that, as the spring 200 constricts when charged with an electric current and heated thereby, the cocking member 198 commences a clockwise rotation. During the initial part of stroke of this clockwise rotation of the cocking member 198, the anchoring member 198c of the cocking member 198 is disengaged from the engaging portion 188b of the first rear blade driving lever 188, so that this first rear blade driving lever 188 immediately makes a clockwise rotation by the action of the spring 192, whereby the driving pin 188a thereof is brought to a position in which it abuts the other end portion of the arcuate slot 1d. As a result, the rear blade which moves interlockingly with the driving pin 188a via a known operating lever is brought from its position of closing the exposure aperture 1a to a position of opening this aperture. And, simultaneously therewith, also the cocking member 198 which, during the initial period of its clockwise rotation, has caused the rear blade to retreat to the opening position as stated above assumes the state that its boss 198d abuts the other end portion of the arcuate slot 1c. In the final period of this movement, the projection 198e of the cocking member 198 urges against the boss 185b to thereby rotate the front blade anchoring lever 185 counter-clockwise. Whereupon, the front blade driving lever 182 is relieved of its anchoring, so that the front blade driving lever 182 is quickly rotated counter-clockwise by the spring 184, whereby causing the front blade to retreat from its closing position to its opening position via an operating lever as known in this field of technique. Also, after the lapse of an appropriate time following this uplifting of anchoring of the front blade driving lever 182, the rear blade anchoring lever 193 is rotated counter-clockwise by an electromagnetic or other appropriate means, thereby relieving the anchoring of the second rear blade driving lever 190, so that the second rear blade driving lever 190 makes a quick counter-clockwise rotation integrally with the first rear blade driving lever 188 by the action of the spring 191, whereby the rear blade which moves interlockingly with the first rear blade driving lever 198 via an operating lever is brought from its opening position to the closing position, and thus one exposure is completed. Also, after the completion of the exposure, the spring 200 returns to its non-conducting state in which it loses resiliency and becomes plastically deformable, so that the cocking member 198 commences a counter-clockwise rotation by the action of the return spring 199. Following this counter-clockwise rotation of the cocking member 198, the cam portion 198a of this cocking member 198 abuts the roller 182b of the front blade driving member 182, and also the roller 198b abuts the second rear blade driving lever 190, respectively, thus starting a clockwise rotation of the front blade driving lever 182 and of the second rear blade driving lever 190. During this part of operation, the first rear blade driving lever 188 which is coupled to the second rear blade driving lever 190 by the spring 192 is in such a state that its engaging portion 188b abuts the anchoring portion 196b of the rear blade drive holding lever 196, so that it is inhibited of its making a clockwise rotation following the second rear blade driving lever 190. When the cocking member 198 makes a further counter-clockwise rotation from the above-mentioned state, the front blade driving lever 182 and the second rear blade driving lever 190 which are caused to rotate clockwise, respectively, due to the further counter-clockwise rotation of the member 198 travel to the vicinity of the illustrated positions, so that the engaging portion 182c of the front blade driving lever 182 is engaged by the anchoring portion 185a of the front blade anchoring lever 185, and along therewith the engaging portion 190b of the second rear blade driving lever 190 is engaged by the anchoring portion 193a of the rear blade anchoring lever 193, so that these two levers 182 and 190 are anchored in the state that the springs 184 and 191 are tensioned, respectively. And, by virtue of this clockwise rotation of the front blade driving lever 182, the front blade which interlockingly moves therewith is brought into a closing position of covering the exposure aperture 1a. Also, in accordance with clockwise rotation of the front blade driving lever 182, the driving pin 182a contacts the cam portion 196a of the rear blade drive holding lever 196 as illustrated also, causing a clockwise rotation of the rear blade drive holding lever 196 only for a trifle amount to thereby cause the anchoring portion 196b of said rear blade drive holding lever 196 to depart from the engaging portion 188b of the first rear blade driving lever 188. At such a time, however, the cocking member 198 has rotated its anchoring portion 198c up to the position in which the latter faces the engaging portion 188b. Therefore, by the contacting of this engaging portion 188b with the anchoring portion 198c, the first rear blade driving lever 198 is blocked of its clock rotation.

From this state, the cocking member 198 is rotated counter-clockwise only a still further and is brought to the illustrated position, so that the cocking member 198 is held in the position in which its boss 198d contacts the end face of the arcuate slot 181c. That is, the cocking member 198 is held in the so-called over-cocked position. At such a moment, the anchoring portion 198c of the cocking member 198 abuts the engaging portion 188b of the first rear blade driving lever 188 as shown, so that the first rear blade driving lever 188 is blocked of its clockwise rotation, and as state above, the rear blade which moves interlockingly with the first rear blade driving lever 188 is in its state of closing the exposure aperture 1a.

What is claimed is:

1. A photographic shutter for use with a shutter blade, comprising:
   an opening and closing member capable of moving between a shutter blade closing position and a shutter blade opening position;
   an opening spring coupled to said opening and closing member for biasing said opening and closing member to move said opening and closing member to said shutter blade opening position;
   a locking member disposed adjacent to said opening and closing member and capable of locking said opening and closing member in said shutter blade closing position;
   an intermediate member disposed for being engageable with said locking member and movable between a first position of not engaging said locking member and a second position of engaging said locking member to release said opening and closing member;
   a first spring coupled to said intermediate member for biasing said intermediate member to its first position;
   a closure driving member disposed for being engageable with said opening and closing member and with said intermediate member and movable between its first position of engaging said intermediate member staying in its first position and its second position of engaging said opening and closing member staying in its shutter blade closing position;
   a closing spring coupled between said intermediate member and said closure driving member and having a spring force greater than that of said opening spring;
   a second spring coupled to said intermediate member and made of a shape memory alloy plastically deformable at normal temperature but restoring, at a high temperature, a resiliency more powerful than the combined resiliency of said first spring and said closing spring, thereby being capable of biasing said intermediate member to move from its first position to its second position; and
   means for heating said second spring at the time of a shutter release,
   whereby when said second spring is heated, said intermediate member is brought from its first position to its second position to thereby tension said closing spring, and when the temperature of said second spring returns to normal temperature at the time of completion of an exposure, said intermediate member is brought from its second position to its first position to move said closure driving member from its second position to its first position.

2. A photographic shutter according to claim 1, in which:
   the heating of said second spring is performed by supplying an electric current thereto.

3. A photographic shutter for use with a shutter blade, comprising:
   an opening and closing member movable between a shutter blade closing position and a shutter blade opening position;
   a closing spring coupled to said opening and closing member for biasing said opening and closing member to move to said shutter blade closing position;
   a shutter driving member disposed for being engageable with said opening and closing member and movable between its first position of not engaging said opening and closing member and its second position of engaging said opening and closing member to move said opening and closing member to said shutter blade opening position;
   a return spring coupled to said driving member for biasing said driving member to its first position;
   releasing means disposed adjacent to said shutter driving member for being able to unlock said shutter driving member to thereby move said shutter driving member from its first position to its second position;
   a first spring coupled between said shutter driving member and said releasing means and made of a shape memory alloy plastically deformable at normal temperature but capable of restoring a resiliency more powerful than that of said return spring at a high temperature; and
   means for heating said first spring at the time of a shutter release,
   whereby when said first spring is heated, said releasing means is actuated to unlock said shutter driving member by said first spring and also to move said shutter driving member from its first position to its second position against the force of closing member, and when the temperature of said first spring returns to normal temperature at the time of completion of an exposure, said shutter driving member is returned from its second position to its first position by said return spring.

4. A photographic shutter according to claim 3, in which:
the heating of said first spring is performed by supplying an electric current thereto.

5. A photographic shutter, comprising:
a shutter opening member movable between a cocked position and an uncocked position;
a shutter closing member disposed in a parallel fashion with said shutter opening member and movable between its cocked position and its uncocked position;
a shutter cocking member disposed in association with said shutter opening member and said shutter closing member and movable between its first position of bringing said shutter opening member and said shutter closing member from their uncocked positions to their cocked positions and its second position of departing from said shutter opening member and said shutter closing member which are in their cocked positions;
an opening spring coupled between said shutter opening member and said shutter cocking member;
a closing spring coupled between said shutter closing member and said shutter cocking member;
a return spring coupled to said shutter cocking member for biasing said shutter cocking member to its first position;
a first spring coupled to said shutter cocking member and made of a shape memory alloy plastically deformable at normal temperature but capable of restoring a resiliency more powerful than that of said return spring at a high temperature;
releasing means disposed for being engageable with said shutter cocking member and capable of releasing said shutter opening member held in its cocked position; and
means for heating said first spring to perform a shutter release,
whereby, when said first spring is heated, said shutter cocking member is brought from its first position to its second position by said first spring to tension said opening spring and said closing spring, and that in the last part of stroke of said shutter cocking member, said releasing means is operated by said shutter cocking member to thereby allow an exposure to be performed, and when the temperature of said first spring returns to normal temperature upon completion of the exposure, said shutter cocking member is brought from its second position to its first position by said return spring.

6. A photographic shutter according to claim 5, in which:
the heating of said first spring is performed by supplying an electric current thereto.

7. A photographic shutter, comprising:
a front blade driving member movable between its cocked position and its uncocked position;
a front blade cocking lever disposed at a position associated with said front blade driving member;
a front blade driving spring coupled between said front blade driving member and said front blade cocking lever;
a front blade releasing lever disposed for being engageable with said front blade driving member and capable of locking said front blade driving member in its cocked position;
a shutter cocking member disposed for being engageable with said front blade cocking lever and with said front blade releasing lever and movable between its first position of engaging said front blade releasing lever and its second position of not engaging said front blade releasing lever;
a rear blade driving member disposed for being engageable with said shutter cocking member and movable between its cocked position and its uncocked position;
a rear blade driving spring coupled to said rear blade driving member;
a first spring coupled to said shutter cocking member for biasing said shutter cocking member to bring same to its second position;
a second spring coupled to said shutter cocking member and made of a shape memory alloy plastically deformable at normal temperature but capable of restoring a resiliency more powerful than that of said first spring at a high temperature for being able to bias said shutter cocking member to bring same to its first position; and
means for heating said second spring to perform a shutter release,
whereby when said second spring is heated, said shutter cocking member is brought from its second position to its first position for enabling an exposure to be performed, and when the temperature of said second spring returns to normal temperature upon completion of the exposure, said shutter cocking member is brought from its first position to its second position by said first spring, whereby said front blade driving member and said rear blade driving member are brought to their cocked positions, respectively.

8. A photographic shutter according to claim 7, in which:
the heating of said second spring is performed by supplying an electric current thereto.

9. A photographic shutter, comprising:
first driving means for moving a closing blade from its closing position to its opening position;
second driving means for moving an opening blade from its closing position to its opening position for commencing an exposure;
starting means capable of staring said opening blade for the purpose of commencing an exposure in a final period of the movement of said closing blade from its closing position to its opening position;
third driving means for returning said closing blade from its opening position to its closing position for the purpose of completing the exposure;
a shutter cocking member urged to return by a first spring and bringing, during its returning period, said first, second and third driving means to their cocked positions, respectively; and
a second spring coupled to said shutter cocking member and made of a shape memory alloy plastically deformable at normal temperature but restoring its initial shape at a high temperature, whereby said second spring actuates said shutter cocking member against the force of said first spring to relieve said first, second and third driving means of their anchoring and also actuates a releasing member,
there being provided means so that said second spring is heated upon generation of a shutter release signal.

10. A photographic shutter according to claim 9, in which:
the heating of said second spring is performed by supplying an electric current thereto.

11. A photographic shutter, comprising:
a front blade driving arm biased by a front blade driving spring;
a rear blade driving arm cocked by said front blade driving arm and biased by a rear blade driving spring;
a rear blade operating lever coupled to said rear blade driving arm via a coupling spring;
a locking lever capable of anchoring said rear blade operating lever in its shutter closing position;
a shutter cocking member urged to make a returning movement by a first spring and capable, during its returning movement, of bringing said front blade driving arm and said rear blade driving arm to their cocked positions, respectively, to thereby tension the two driving springs and said coupling spring; and
a second spring coupled between said shutter cocking member and a lock releasing member and made of a shape memory alloy and capable, by virtue of its nature of becoming plastically deformable at normal temperature but restoring its initial shape at a high temperature, of actuating said lock releasing member and actuating said shutter cocking member against the force of said first spring to thereby relieve said front blade driving arm of its anchoring and also to actuate said releasing member,
there being provided means so that said second spring is heated upon generation of a shutter release signal.

12. A photographic shutter according to claim 11, in which:
the heating of said second spring is performed by supplying an electric current thereto.

13. A photographic shutter, comprising:
a front blade driving arm biased by a front blade driving spring;
a rear blade driving arm cocked by said first blade driving arm and biased by a rear blade driving spring;
a rear blade operating lever coupled to said rear blade driving arm via a coupling spring;
a locking lever for anchoring said rear blade operating lever in its shutter closing position;
a shutter cocking member urged to make a returning movement by a first spring and capable of bringing, during its returning movement, said front blade driving arm and said rear blade driving arm to their cocked positions, respectively, to thereby tension the two driving springs and said coupling spring; and
a second spring coupled to said shutter cocking member and made of a shape memory alloy plastically deformable at normal temperature but restoring its initial shape at a high temperature, thereby actuating said shutter cocking member against said first spring to remove the anchoring of said front blade driving arm and also to remove the anchoring action of said locking lever, and, due to the resulting action of said rear blade operating lever, to actuate a releasing member,
there being provided means so that said second spring is heated upon generation of a shutter release signal.

14. A photographic shutter according to claim 13, in which:
the heating of said second spring is performed by supplying an electric current thereto.

15. A photographic shutter, comprising:
a front blade driving lever biased by a front blade driving spring;
a first rear blade driving lever;
a second rear blade driving lever coupled to said first rear blade driving lever by a coupling spring and biased by a rear blade driving spring;
a shutter cocking member urged to make a returning movement by a first spring for anchoring said first rear blade driving lever in its shutter cocking position and for bringing said front blade driving lever and said second rear blade driving lever to their cocked positions, respectively, to thereby tension the two driving springs and said coupling spring; and
a second spring coupled to said shutter cocking member and made of a shape memory alloy plastically deformable at normal temperature and restoring its initial shape at a high temperature, thereby actuating said shutter cocking member against said first spring to remove the anchoring of said front blade driving lever and of said second rear blade driving lever and along therewith to actuate a releasing member,
there being provided means so that said second spring is heated upon generation of a release signal.

16. A photographic shutter according to claim 15, in which:
the heating of said second spring is performed by supplying an electric current thereto.

* * * * *